UNITED STATES PATENT OFFICE.

WALTER E. WRIGHT, OF CLEVELAND, OHIO.

PAINT COMPOSITION.

1,226,934.     Specification of Letters Patent.     Patented May 22, 1917.

No Drawing.     Application filed August 26, 1916. Serial No. 117,006.

*To all whom it may concern:*

Be it known that I, WALTER E. WRIGHT, a citizen of the United States of America, residing at Cleveland, in the county of Cuyahoga and State of Ohio, have invented certain new and useful Improvements in Paint Compositions; and I hereby declare the following to be a full, clear, and exact description of the invention, such as will enable others skilled in the art to which it pertains to make and use the same.

This invention relates to an improved paint composition comprising a lead pigment and a vehicle of vegetable oils, and more especially suitable for use in painting interior walls of buildings and in producing a slow-drying washable and durable coat of paint having a flat or dull finish.

I would here remark that I am aware that most of the paint compositions heretofore made for producing a flat or dull finish contain zinc, lithopone or inert pigments, and wall paints having such pigments dry very hard and when applied to a smooth wall usually crack and peel off when repainted with like materials and, when applied to a sand wall, pile up at the laps. Also such paints usually form a thick skin in a very few hours if exposed to the atmosphere in an open vessel, and white lithopone paint will turn gray if exposed to a very strong light after being applied to a surface.

I would also remark that a paint composition consisting of carbonate of lead and a vehicle of linseed oil in the proportion, by weight, of from eight to ten parts of linseed oil to one hundred parts of carbonate of lead and thinned with turpentine or other thinning vehicle dries too quickly for practical use on walls and therefore requires two or three times as many workmen to satisfactorily paint a given surface as would be needed to apply the usual flat or dull finish paints made from zinc or lithopone. Also any excess of linseed oil over said proportion will produce a slight gloss and the gloss will increase until the maximum of oil is added to the pigment to produce the average lead paint composed of carbonate of lead and linseed oil in the proportion, by weight, of about forty-five parts of linseed oil to one hundred parts of carbonate of lead, with no other vehicle added. Also more oil added to linseed oil paint makes it less washable because linseed oil thoroughly saponifies with alkali-soap.

My invention has in view the production of a paint composition comprising a suitable lead pigment and certain vegetable oils in such relative proportions as will render possible the production of a slow-drying flat or dull finish washable wall paint, that will give the workman sufficient time to apply, that will not show laps, and that will not crack or peel from a smooth wall or pile up on sand walls.

My improved paint composition comprises a suitable lead pigment, such, for instance, as carbonate of lead or sublimed lead, and drying vegetable oils, such, for instance, as linseed oil and Chinese tung oil and a semi-drying vegetable oil, such, for instance, as soja bean oil or cotton seed oil, and to produce a liquid paint ready for application to a wall enough turpentine or petroleum distillate or other thinning vehicle is added. In carrying out my invention however, the quantity of tung oil used is less, by weight, than three per cent. of the quantity of lead pigment used. Very satisfactory results have been attained by adding to each one hundred pounds of the lead pigment about five pounds of linseed oil, about one and two-thirds pounds of tung oil and about three and one-third pounds of soja bean oil. Fairly good results have, however, been attained by adding to each one hundred pounds of the lead pigment about eight pounds of linseed oil, about two thirds of a pound of tung oil and about one and one-third pounds of soja bean oil. Also fairly good results have been attained by adding to each one hundred pounds of the lead pigment about two pounds of linseed oil, about two and two-thirds pounds of tung oil and five and one-third pounds of soja bean oil. The lead pigment is of course mixed with the vegetable oil vehicle in a finely divided state.

I would here remark that linseed oil dries with a tough and elastic skin which makes it the most desirable oil as a binder for a lead paint, and that linseed oil dries too quickly for a flat paint, but in a coat of paint embodying my invention the drying of the linseed oil is retarded by the small quantity of the soja bean oil or other semi-drying vegetable oil which of itself dries tacky and would be undesirable and impractical without the presence of the very small quantity of Chinese tung oil which of itself dries with a waxy film and which is the strongest drying vegetable oil known and which when used in proper proportions produces a catalytic condition and formation with linseed oil, a semi-drying vegetable oil, such, for instance, as soja bean oil or cotton seed oil, carbonate of lead or sublimed lead and turpentine or petroleum distillate, but said catalytic condition I have found is only produced by the use of a very small quantity of tung oil and a semi-drying vegetable oil substantially in the proportion, by weight, of about two parts of the latter to one part of the former.

It will be observed that in carrying out my invention the vehicle of vegetable oils and the lead pigment are used substantially in the proportion, by weight, of not more than about ten parts of the said vehicle to about one hundred parts of the pigment, that the tung oil and the soja bean oil or semi-drying vegetable oil are used in very small quantities and in the proportion, by weight, of about two parts of the semi-drying vegetable oil to one part of the tung oil. In other words, about one half as much tung oil as soja bean oil or semi-drying vegetable oil is used. The use of about twice as much soja bean oil or semi-drying vegetable oil as tung oil is important to adequately check drying of the tung oil. On the other hand, too much soja bean oil or semi-drying vegetable oil will produce stickiness, and too much tung oil prevents adequate checking of the drying of the tung oil by the soja bean oil or semi-drying vegetable oil.

It will be observed therefore that my improved paint composition is composed of a suitable lead pigment and a vehicle of vegetable oils therefor, and that said vehicle essentially comprises small quantities of tung oil and a semi-drying vegetable oil, such, for instance, as soja bean oil or cotton seed oil, substantially in the proportion, by weight, of about two parts of said semi-drying oil to one part of the tung oil. Of course my improved paint composition may be in the form of what is known as keg lead without turpentine or other thinning vehicle, or in the form of liquid paint ready to be applied to a wall to be painted and containing enough turpentine or other thinning vehicle.

A paint composition embodying my invention is effective in producing a coat of paint which will dry more slowly than any lead paint heretofore produced and yet give the workman adequate time to execute his work and have enough elasticity to prevent cracking and peeling such as occurs with ordinary flat wall paints. A flat lead paint embodying my invention dries firm and thoroughly and is washable and alkali-resisting and is so penetrating and adhesive as to prevent, when applied to old walls that were previously painted with wall paints made from zinc or lithopone and cracked and scaled, any further cracking and peeling.

A wall paint embodying my invention is adapted to cover from fifty to seventy-five per cent. more wall surface, per gallon, of paint, than any zinc or lithopone wall paint, and does not pile up when lapped.

What I claim is:—

1. A flat finish paint-composition comprising a lead pigment and a vehicle which comprises a semi-drying vegetable oil, tung oil and a drying vegetable oil other than tung oil, said vehicle and the pigment being substantially in the proportion, by weight, of not over about ten parts of the vehicle to one hundred parts of the pigment, the third-mentioned oil of the vehicle composing, by weight, about one-half of the vehicle, and the tung oil and the semi-drying vegetable oil being in the proportion, by weight, of about two parts of the semi-drying oil to one part of tung oil.

2. A flat finish paint-composition comprising a lead pigment and a vehicle which comprises a semi-drying vegetable oil, tung oil and a drying vegetable oil other than tung oil, said vehicle and the pigment being substantially in the proportion, by weight, of not over about ten parts of the vehicle to one hundred parts of the pigment, the third-mentioned oil of the vehicle composing, by weight, not less than about one-fifth of the vehicle, and the tung oil and the semi-drying vegetable oil being in the proportion, by weight, of about two parts of the semi-drying oil to one part of tung oil.

3. A flat finish paint-composition comprising a lead pigment and a vehicle which comprises a semi-drying vegetable oil, tung oil and a drying vegetable oil other than tung oil, said vehicle and the pigment being substantially in the proportion, by weight, of not over about ten parts of the vehicle to one hundred parts of the pigment, the third-mentioned oil of the vehicle composing, by weight, not more than about four-fifths of the vehicle, and the tung oil and the semi-drying vegetable oil being in the proportion, by weight, of about two parts of the semi-drying oil to one part of tung oil.

4. A flat finish paint-composition comprising a lead pigment and a vehicle which comprises linseed oil, a semi-drying vegetable oil and tung oil, said vehicle and the pigment being substantially in the proportion, by weight, of not over about ten parts of the vehicle to one hundred parts of the pigment, the linseed oil composing, by weight, about one-half of the vehicle, and the tung oil and the semi-drying vegetable oil being in the proportion, by weight, of about two parts of the semi-drying oil to one part of the tung oil.

5. A flat finish paint-composition comprising a lead pigment and a vehicle which comprises linseed oil, a semi-drying vegetable oil and tung oil, said vehicle and the pigment being substantially in the proportion, by weight, of not over about ten parts of the vehicle to one hundred parts of the pigment, the linseed oil composing, by weight, not less than about one-fifth of the vehicle, and the tung oil and the semi-drying vegetable oil being in the proportion, by weight, of about two parts of the semi-drying oil to one part of tung oil.

6. A flat finish paint-composition comprising a lead pigment and a vehicle which comprises linseed oil, a semi-drying vegetable oil and tung oil, said vehicle and the pigment being substantially in the proportion, by weight, or not over about ten parts of the vehicle to one hundred parts of the pigment, the linseed oil composing, by weight, not more than about four-fifths of the vehicle, and the tung oil and the semi-drying vegetable oil being in the proportion, by weight, of about two parts of the semi-drying oil to one part of tung oil.

7. A flat finish paint-composition comprising a lead pigment and a vehicle which comprises a semi-drying vegetable oil, tung oil and a drying vegetable oil other than tung oil, the tung oil and the pigment being in the proportion, by weight, of less than three parts of the tung oil to one hundred parts of the pigment, and the semi-drying oil and the tung oil being in the proportion, by weight, of about two parts of the semi-drying oil to one part of the tung oil.

8. A flat finish paint-composition comprising a lead pigment and a vehicle which comprises linseed oil, a semi-drying vegetable oil and tung oil, said vehicle and the pigment being in the proportion, by weight, of not more than about ten parts of the vehicle to one hundred parts of the pigment, the semi-drying oil and the tung oil being in the proportion, by weight, of about two parts of the semi-drying oil to one part of the tung oil, and the tung oil and the pigment being in the proportion, by weight, of less than three parts of the tung oil to one hundred parts of the pigment.

In testimony whereof, I sign the foregoing specification, in the presence of two witnesses.

WALTER E. WRIGHT.

Witnesses:
B. C. Brown,
Emil W. Kryz.